(12) United States Patent
Greenwalt

(10) Patent No.: US 6,820,828 B1
(45) Date of Patent: Nov. 23, 2004

(54) CIRCLE IRRIGATION CHEMICAL APPLICATION

(76) Inventor: Arnold J Greenwalt, 548 Hwy. 281 North, Quincy, WA (US) 98848

(*) Notice: Subject to any disclaimer, the term of this patent is extended or adjusted under 35 U.S.C. 154(b) by 0 days.

(21) Appl. No.: 10/278,505

(22) Filed: Oct. 23, 2002

(51) Int. Cl.⁷ .................................................. B05B 3/00
(52) U.S. Cl. ....................................................... 239/726
(58) Field of Search .......................... 239/70, 722, 723, 239/726, 728, 730, 732, 734; 212/182, 243; 414/626

(56) References Cited

U.S. PATENT DOCUMENTS

| | | | |
|---|---|---|---|
| 3,326,232 A | | 6/1967 | Stamps et al. |
| 3,589,604 A | * | 6/1971 | Paul ............................. 239/91 |
| 3,648,930 A | | 3/1972 | Brown et al. |
| 3,907,235 A | * | 9/1975 | Gaubert ....................... 242/554 |
| 3,979,062 A | | 9/1976 | Christensen et al. |
| 4,184,639 A | * | 1/1980 | Miller ........................ 239/733 |
| 4,262,812 A | * | 4/1981 | Bremenkamp .............. 212/243 |
| 4,277,026 A | | 7/1981 | Garvey |
| 4,397,421 A | | 8/1983 | Schram |
| 4,763,836 A | | 8/1988 | Lyle et al. |
| 5,246,164 A | | 9/1993 | McCann et al. |
| 5,678,771 A | | 10/1997 | Chapman |
| 5,779,163 A | | 7/1998 | Gunter |
| 6,036,121 A | | 3/2000 | Gerdes |
| 6,138,928 A | | 10/2000 | LaRue et al. |
| 6,230,091 B1 | | 5/2001 | McQuinn |

* cited by examiner

*Primary Examiner*—Michael Mar
*Assistant Examiner*—Thach H. Bui
(74) *Attorney, Agent, or Firm*—Michael I Kroll

(57) ABSTRACT

The invention discloses a circle irrigation system providing improved chemical application control within said system by varying the height from the chemical application nozzles to the application area, spacing of the nozzles along the boom, delay switches for movement of the towers relative to turning the nozzles on and off, diaphragms providing quick cycling of the on-off of the nozzles without leakage, pressure valves for varying the nozzle pressure within a boom and means for mixing and monitoring a plurality of chemicals within water and eliminating the possibility of back flushing the chemical mixture into the water supply.

10 Claims, 7 Drawing Sheets

CIRCLE IRRIGATION CHEMICAL APPLICATION

BACKGROUND OF THE INVENTION

1. Field of the Invention

The present invention relates generally to circle irrigation and, more specifically, to chemical application control within said systems by varying the height from the chemical application nozzles to the application area, spacing of the nozzles along the boom, delay switches for movement of the towers relative to turning the nozzles on and off, diaphragms providing quick cycling of the on-off of the nozzles without leakage, pressure valves for varying the nozzle pressure within a boom and means for mixing and monitoring a plurality of chemicals within water and eliminating the possibility of back flushing the chemical mixture into the water supply.

2. Description of the Prior Art

There are other irrigation system designed for circle irrigation. Typical of these is U.S. Pat. No. 3,326,232 issued to Otis C. Stamps et al. on June 20, 1967.

Another patent was issued to Brown et al. on Mar. 14, 1972 as U.S. Pat. No. 3,648,930. Yet another U.S. Pat. No. 3,979,062 was issued to Christensen et al. on Sep. 7, 1976 and still yet another was issued on Jul. 7, 1981 to Garvey as U.S. Pat. No. 4,277,026.

Another patent was issued to Schram on Aug. 9, 1983 as U.S. Pat. No. 4,397,421. Yet another U.S. Pat. No. 4,763,836 was issued to Lyle et al. on Aug. 16, 1988. Another was issued to McCann et al. on Sep. 21, 1993 as U.S. Pat. No. 5,246,164 and still yet another was issued on Oct. 21, 1997 to Chapman as U.S. Pat. No. 5,678,771.

Another patent was issued to Gunther on Jul. 14, 1998 as U.S. Pat. No. 5,779,163. Yet another U.S. Pat. No. 6,036,121 was issued to Gerdes on Mar. 14, 2000. Another was issued to LaRue et al. on Oct. 31, 2000 as U.S. Pat. No. 6,138,928 and still yet another was issued on May 8, 2001 to McQuinn as U.S. Pat. No. 6,230,091.

U.S. Pat. No, 3,326,232

Inventor: Otis C. Stamps et al.

Issued: Jun. 20, 1967

Shown is an apparatus for distributing liquid fertilizer to land comprising a container for liquid fertilizer, a conduit therefrom leading to a first pump means to raise the pressure of liquid and connected thereto, outlet means from said pressure raising first pump means leading to a pressure indicating means and connected operatively thereto, an adjustable pressure relief valve connected to said outlet means, a flowmeter with an inlet and outlet, and an inlet of said flowmeter connected to said outlet means from said pressure raising first pump means, the outlet of the pressure relief means operatively connected to said container, a flow regulating means operatively attached to the outlet end of said flowmeter, said flow regulating means provided with an outlet means, a check valve, that outlet means to connected to the inlet of said check valve, a water well, a second pump operatively attached to that well water, a motor operatively attached to that second pump, a discharge line operatively attached to the second pump, a moving irrigator operatively attached to the line, the outlet of said check valve is operatively connected to said line, a shaft is connected to the motor and driven thereby, and said shaft is connected to the second pump and drives the second pump and is connected to and drives the first pump means for raising the pressure of said liquid fertilizer.

U.S. Pat. No. 3,648,930

Inventor: Perry R. Brown et al.

Issued: Mar. 14, 1972

A system for applying agricultural chemicals in small amounts over a large area. A low-capacity spray system carried on and operated by a high-capacity self-propelled sprinkling irrigation system. A group of oscillating spray arms carried on and spaced along an irrigation pipeline, the arms being oscillated and the spray being turned on by the irrigation pipeline motor control to provide spraying as the pipeline is moved.

U.S. Pat. No. 3,979,062

Inventor: Dale A. Christensen et al.

Issued: Sep. 7, 1976

A water balance control for a pivotal end boom connected to the outer end of a center pivot irrigation system to irrigate peripheral areas (e.g., corners) beyond the periphery of the circular area covered by the main conduit of the system; the water balance control comprises a sensing mechanism for sensing both the angular position of the boom and its direction of movement (swing-out or swing-in) relative to the end of the main conduit. Primary control circuits, actuated by the sensing mechanism, turn the boom nozzles on and off, depending on the angular position of the boom; secondary control circuits, also actuated by the sensing mechanism, operate the primary controls in accordance with two different programs, one for swing-out movement and the other for swing-in movement. A speed control for the main conduit, also actuated by the sensing mechanism, is included.

U.S. Pat. No. 4,276,026

Inventor: Peter M. Garvey

Issued: Jul. 7, 1981

Apparatus for treating a field crop with liquid chemical for use with a water irrigation system of the type including a plurality of longitudinally spaced towers, and a mechanism for intermittently moving each of the towers to move the system through the field. The apparatus comprises a first assembly for applying liquid chemical to the field crop canopy and/or ground in a first pattern arranged to extend from one of the towers a majority of the distance toward an adjacent tower in amounts which diminish in a direction away from the one tower, a solenoid valve for communicating liquid chemical under pressure with the first pattern applying assembly only when the one tower is in motion. A second assembly for applying liquid chemical to the field crop canopy and/or ground in a second pattern arranged to extend from the adjacent tower for a majority of the distance toward the one tower in amounts which diminish in a direction away from the adjacent tower, and a solenoid valve for communicating liquid chemical under pressure with the second pattern applying means only when the adjacent tower is in motion.

U.S. Pat. No. 4,397,421

Inventor: Daniel R. Schram

Issued: Aug. 9, 1983

A liquid chemical spraying apparatus is described whereby liquid chemical may be applied to a field by utilizing a center pivot irrigation system. The center pivot irrigation system comprises a water supply pipe which is movable about a center pivot and which is supported by a plurality of spaced-apart drive towers for propelling the supply pipe around the center pivot. Each of the drive towers includes an electric drive that is responsive to an alignment control to maintain the supply pipe in an aligned condition as it travels about the center pivot. The spraying apparatus is vertically movably supported from the supply pipe or the truss system supporting the pipe. The spraying apparatus comprises a main supply line, which is in communication with a source of liquid chemical. First and second applicator lines are in fluid communication with the main supply line. A control valve is positioned between the main supply line and the applicator lines at each of the drive towers and is operatively connected to the alignment control for the drive tower so that chemical will be supplied from the main supply line to the applicator lines only when the associated drive tower is being driven. Manually operated selector valves are positioned between the main supply line control valve and the applicator lines so that chemical may be selectively supplied to either or both of the applicator lines. A plurality of spaced-apart spray nozzles are provided on each of the applicator lines for spraying the chemical on the area beneath the irrigation system. The source of chemical, main supply line and applicator lines are fluidly isolated from the water in the water supply pipe to prevent contamination of the source of water. The chemical may be sprayed on to the area in conjunction with or apart from the application of water to the field.

U.S. Pat. No. 4,763,836

Inventor: William M. Lyle

Issued: Aug. 16, 1988

Apparatus for precise water and liquid chemical application to agricultural fields is provided comprising a control platform with two motors, each motor driving a separate set of drive wheels. The speed of the first platform motor being selectable, the speed of the second motor being controlled by a variable frequency AC motor controller which receives a signal from a linear position transducer which senses the positional relationship of the control platform to a predetermined path so as to maintain the platform on a predetermined path. A second variable frequency AC motor controller receives a signal from a second linear position transducer between the control platform and a plurality of span sections supported by a plurality of motorized, wheeled towers which is operable to maintain alignment between the towers and the control platform, and the span sections are provided with switches operable to switch the motors of the towers on and off momentarily as required to keep them in alignment with each other. Water and chemicals are transported independently along the span sections and into separate nozzle systems at appropriate pressures for dispensing, each span being provided with at least one chemical and one water nozzle system. The nozzles of each nozzle system may be oscillated vertically under direction of a programmable controller, and each nozzle system may be positioned horizontally along the span section. The chemical nozzle systems may be further directed by the programmable controller to dispense chemicals only from certain nozzle systems at any given time. The apparatus may be used for low energy precision application agricultural methods.

U.S. Pat. No. 5,246,164

Inventor: Ian R. McCann

Issued: Sep. 21, 1993

Disclosed are a method and apparatus (10) for cataloging or dividing a given field, under irrigation by an irrigation system (100), into a plurality of zones which can be monitored for irrigation water and chemical requirements and then, delivering by way of the irrigation system, the appropriate amount of irrigation water and/or chemicals to each zone as so defined. Each of the sprinkler assemblies (105) is independently controlled by a solenoid operated valve (16), responsive to a control module (15). The control modules (15), in turn, are electronically interconnected with a data acquisition and control unit (12) which is capable of sending to the control modules (15) coded signals for either activating the sprinkler head (105) or deactivating each individual sprinkler head (105). A microprocessor (11) is provided which is programmed to determine the current position of each independent sprinkler assembly (105), to generate maps from field data or digital images, and to test for map positions which correspond to the current sprinkler positions and return the water or chemical application requirements as portrayed on the map. The microprocessor (11) then sends this information to the data acquisition and control system (12), which in turn sends these signals to the various control modules (15).

U.S. Pat. No. 5,678,771

Inventor: John A. Chapman

Issued: Oct. 21, 1997

A chemical distribution system for use with a mobile irrigation system comprising a liquid chemical supply line vertically adjustably supported on the irrigation system and which is in operative communication with a pressurized source of liquid chemical. A liquid chemical distribution line is positioned beneath the chemical supply line between each pair of the drive towers for the irrigation system and which is in fluid communication with a remotely controlled, electrically operated solenoid valve which is in fluid communication with a chemical supply line. A plurality of spaced-apart emitter valves, having a sprinkler associated therewith, are provided on each of the distribution lines with the associated solenoid valve being operated by a control for activating selective distribution lines whereby liquid chemical may be applied to preselected portions of the area over which the irrigation system moves. An adjustable hydraulic accumulator is associated with each of the emitter valves to meter the amount of liquid chemicals being applied to the field.

U.S. Pat. No. 5,779,163

Inventor: Uil L. Gunter

Issued: Jul. 14, 1998

A center pivot irrigation system is provided with longitudinally spaced drop tubes including flexible lower end portions for dragging upon the ground and an elongated low height tension member is tensioned between adjacent towers with structure by which the lower end portions of the drops may be clamped to the tension member.

U.S. Pat. No. 6.036,121

Inventor: Jerry D. Gerdes

Issued: Mar. 14, 2000

The method of controlling the speed of the last regular drive unit of a center pivot irrigation system having a comer irrigation system pivotally connected thereto is disclosed comprising the steps of: placing a pressure transducer at the downstream side of the main water line for monitoring the changes in main water line pressure as the sprinklers on the extension water line are sequenced; driving the last regular drive unit at a predetermined speed; recording the output of the pressure transducer at predetermined intervals; comparing the recorded output at the predetermined intervals to the pressure recorded when all the sprinklers on the extension line are turned off; and varying the speed of the last regular drive unit according to the formula NEW SPEED=(END PRESSURE/RETRACTED END PRESSURE).sup.2 times.L.R.D.U. SPEED SETTING.

U.S. Pat. No. 6,138,928

Inventor: Jacob L. LaRue et al.

Issued: Oct. 31, 2000

A liquid suspension distribution system is provided which is essentially a conventional center pivot irrigation system, but which has the innermost sprinkler guns sequenced by way of a programmable logic control. The innermost sprinkler guns are sequenced on and off by the programmable logic controller so that an even distribution of the liquid manure or the like is achieved on the field.

U.S. Pat. No. 6,230,091

Inventor: Alvin E. McQuinn

Issued: May 8, 2001

A variable flow spray nozzle system for delivering a plurality of crop inputs over an agricultural field using a spray boom having a plurality of release zones. Each release zone on the boom is has multiple nozzle modules, and each nozzle module is individually controlled and capable of variable flow. A control system in communication with each nozzle module and a positioning system, such as a GPS system, controls the application of multiple crop inputs so that the crop inputs are applied at a variable prescriptive rate. Thus, it is possible to vary the flow of crop inputs along the length of the boom as well as in a direction substantially transverse to the direction of the boom.

While these irrigation systems may be suitable for the purposes for which they were designed, they would not be as suitable for the purposes of the present invention, as hereinafter described.

SUMMARY OF THE PRESENT INVENTION

A primary object of the present invention is to provide a controlled means for applying a chemical to a crop according to the predetermined parameters.

Another object of the present invention is to provide a means for preventing back-flow of the chemical mixture into the water supply.

Yet another object of the present invention is to provide means for controlling the discharge from a nozzle.

Still yet another object of the present invention is to provide means for controlling the height of the discharge system relative the crop height.

Another object of the present invention is to provide means for varying the pressure of the chemical mixture within the supply line.

Yet another object of the present invention is to provide means for controlling the timing of the nozzle discharge and shut-off.

Still yet another object of the present invention is to provide a circle irrigation system having a main mixture supply line providing pressurized chemical mixture to a secondary nozzle supply line.

Another object of the present invention is to provide a circle irrigation system having a feedline positioned between the main supply line and the nozzle supply line on each tower.

Yet another object of the present invention is to provide a circle irrigation system having an electric solenoid valve positioned on each feedline between the main mixture supply line and the secondary nozzle supply line.

Still yet another object of the present invention is to provide a circle irrigation system having a flow regulator switch positioned on each feedline between the main mixture supply line and the secondary nozzle supply line.

Another object of the present invention is to provide a circle irrigation system having a flow regulator switch positioned on each feedline between the main mixture supply line and the secondary nozzle supply line.

Yet another object of the present invention is to provide a circle irrigation system having a check valve positioned between the flow regulator switch positioned and the secondary nozzle supply line.

Still yet another object of the present invention is to provide a circle irrigation system having a quick disconnect coupling positioned at each tower on the secondary nozzle supply line.

Another object of the present invention is to provide each boom secondary nozzle supply line with pulley means for adjusting the height of the secondary nozzle supply line relative to ground level.

Yet another object of the present invention is to provide each boom secondary nozzle supply line with two centrally disposed check valves and flow regulators to allow flow from adjacent supply solenoid if positioned supply solenoid is off.

Still yet another object of the present invention is to provide a circle irrigation system having micro switch within the tower control whereby the tower motor can be delayed by a predetermined period of time.

Another object of the present invention is to provide a circle irrigation system having the discharge nozzles varyingly spaced between a first and second tower.

Yet another object of the present invention is to provide a circle irrigation system having diaphragms within each nozzle for quickly discharging a predetermined amount of chemical mixture and for quickly shutting off the discharge when the pressure is below a predetermined point.

Additional objects of the present invention will appear as the description proceeds.

The present invention overcomes the shortcomings of the prior art by providing a circle irrigation chemical application systems having means for varying the height from the chemical application nozzles to the application area, spacing of the nozzles along the boom, delay switches for turning the nozzles on and off relative to the movement of the towers, diaphragms providing quick cycling of the on-off of the nozzles without leakage, pressure valves for varying the nozzle pressure within a boom and means for mixing and monitoring a plurality of chemicals within water and eliminating the possibility of back flushing the chemical mixture into the water supply.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

| LIST OF REFERENCE NUMERALS UTILIZED IN THE DRAWINGS | |
|---|---|
| 10 | circle irrigation system |
| 12 | tower |
| 14 | tower motor |
| 16 | tower control box |
| 18 | time delay relay |
| 22 | main distribution line |
| 24 | spray boom supply hose |
| 26 | spray boom |
| 28 | supply solenoid |
| 30 | spray boom adjustment pulley |
| 32 | spray boom support brace |
| 34 | spray boom support rods |
| 36 | spray boom adjustment spool |
| 38 | spray boom adjustment cable |
| 40 | support rod cable attachment |
| 42 | support rod height adjuster |
| 44 | flow regulator |
| 46 | check valve |
| 48 | quick disconnect |
| 50 | nozzle |
| 52 | chemical supply |
| 54 | chemical tank |
| 56 | multiport chemical injector pump |
| 58 | water supply |
| 60 | check valve |
| 62 | pump motor |
| 64 | solenoid |
| 66 | water pump |
| 68 | flow meter |
| 70 | Height adjustment crank |

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
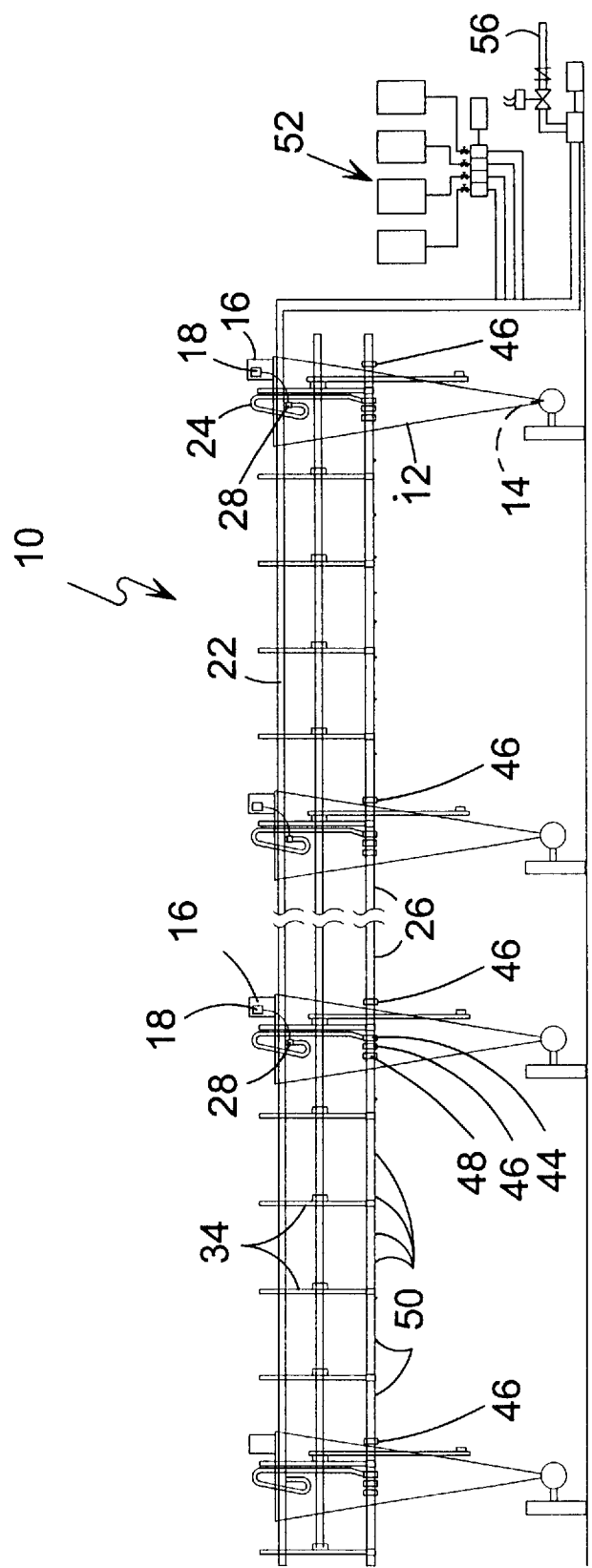
FIG. 1 is an illustrative view of the present invention.

Referring to FIG. 1, shown is the circle irrigation system 10 of the present invention for controlling the application of a chemical mixture. The system 10 is comprised of towers 12 having motive means 14 engaged by tower control box 16 whereby the towers 12 move in a circular path around a pivot point. The towers 12 support a main distribution line 22 having chemical source 52 and a water source 58. Main distribution line 22 has a plurality of spray boom supply hoses 24 providing connection between the main distribution line 22 and spray boom 26. Spray boom 26 is supported by a plurality of support rods 34 that can be moved to adjust the height of the spray boom 26 for chemical application. Spray boom supply hose 24 has a supply solenoid 28 that controls the supply from the main distribution line 22 to the spray boom 26. The tower control box 16 contains a time delay relay 18 that causes a delay in the tower 12 movement via motor 14 while the spray boom 26 is pressurized to prevent gaps in the application. The interface between the spray boom 26 and spray boom supply hose 24 has a flow regulator 44, check valve 46 and quick disconnect 48. Quick disconnect 48 provides for disconnecting a section of spray boom 26 during height adjustment. Each of the nozzles 50 also has a diaphragm to prevent leakage of the mixture as the nozzles are turned on and off. The check valve 46 determines direction of flow while the flow regulator 44controls the application rate. Also provided is multiport chemical injector pump 56 with variable speed motor 62.

Figure 2:
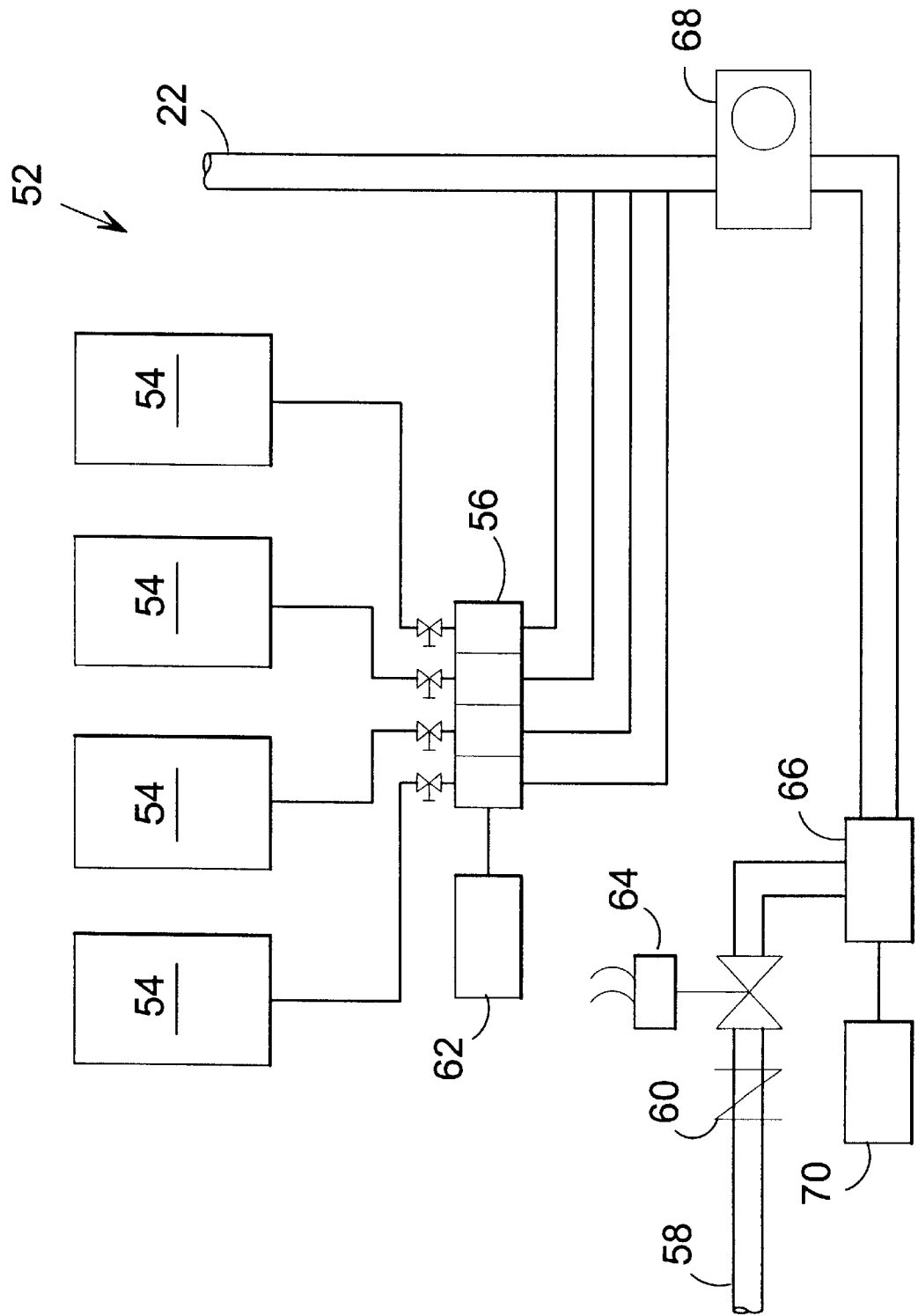
FIG. 2 is a block diagram of the chemical mixture.

Referring to FIG. 2, shown is a block diagram of the chemical mixture 52 having a plurality of chemical tanks 54 and a multiport chemical injection pump 56 with pump motor 62 providing a predetermined chemical mixture that will be applied to a crop. The water supply 58 has a check valve 60 and water supply solenoid 64 that prevents back flushing of the chemical mixture into the water supply 58. Pump motor 70 and water pump 66 pressurize the main distribution line 22. The supply line has a centrifugal pump 66 providing predetermined gallons per minute supply that will provide 50 to 65 lbs. main distribution line 22 pressure. Flow meter 68 controls speed of pump motor 62, which drives pump 56 providing pre determined chemical mixture supply at varying flow rates.

Figure 3:
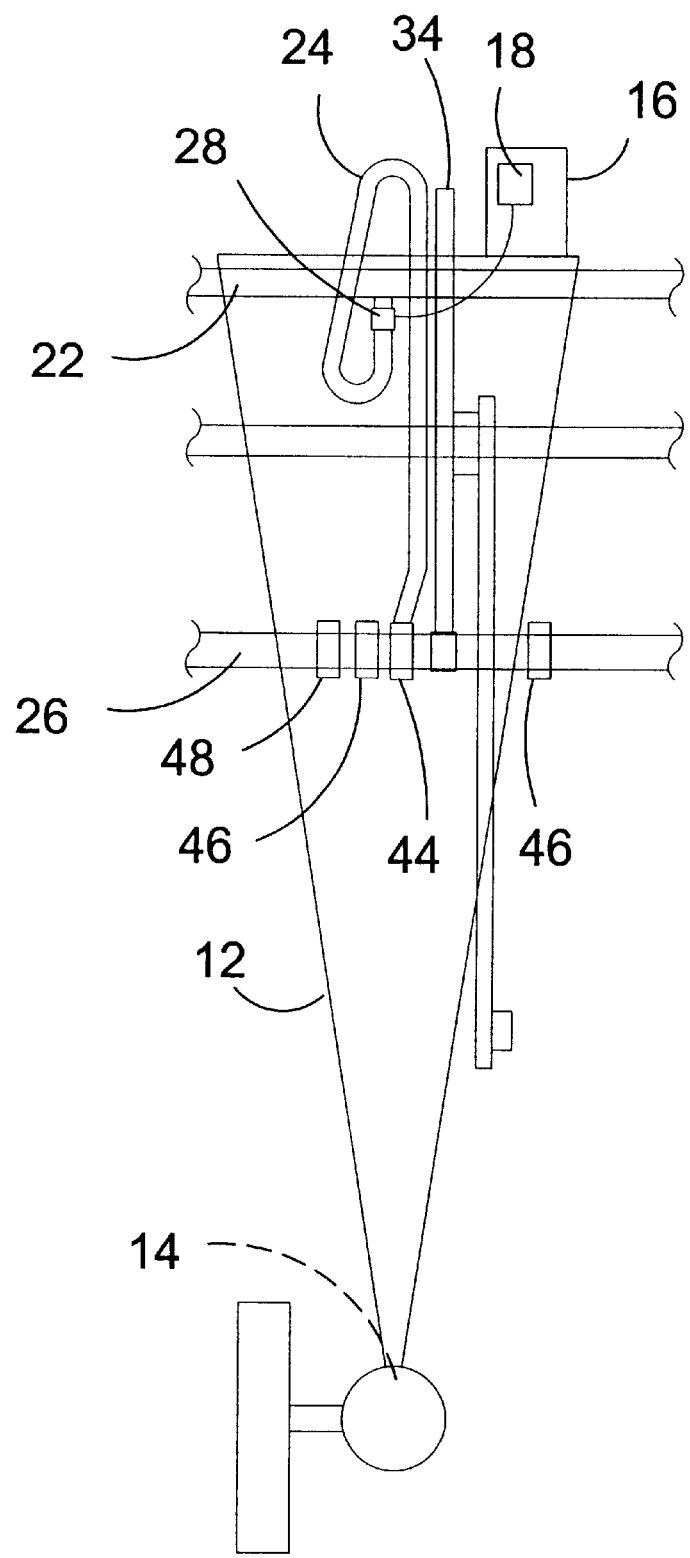
FIG. 3 is an illustrative view of the time delay switch.

Referring to FIG. 3, shown is a tower 12 of the circle irrigation system 10 of the present invention. The towers 12 has motive means 14 engaged by the tower control box 16 for engaging and disengaging the tower drive motor with a time delay switch 18 which retards movement of the tower 12 a fraction of a second while the spray boom is pressurized through supply solenoid 28. The tower 12 supports a main distribution line 22 having and a spray boom supply hose 24 providing connection between the main distribution line 22 and spray boom 26. Spray boom 26 is supported by a plurality of support rods 34 that can be moved to adjust the height of the spray boom 26. Spray boom supply hose 24 has a supply solenoid 28 that control the supply from the main distribution line 22 to the spray boom 26. The interface between the spray boom 26 and spray boom supply hose 24 has a flow regulator 44 and quick disconnect 48. Quick disconnect 48 provides for disconnecting a section of spray boom 26 during height adjustment. The two check valves 46 determine direction of flow while the flow regulator 44controls the application rate.

Figure 4:
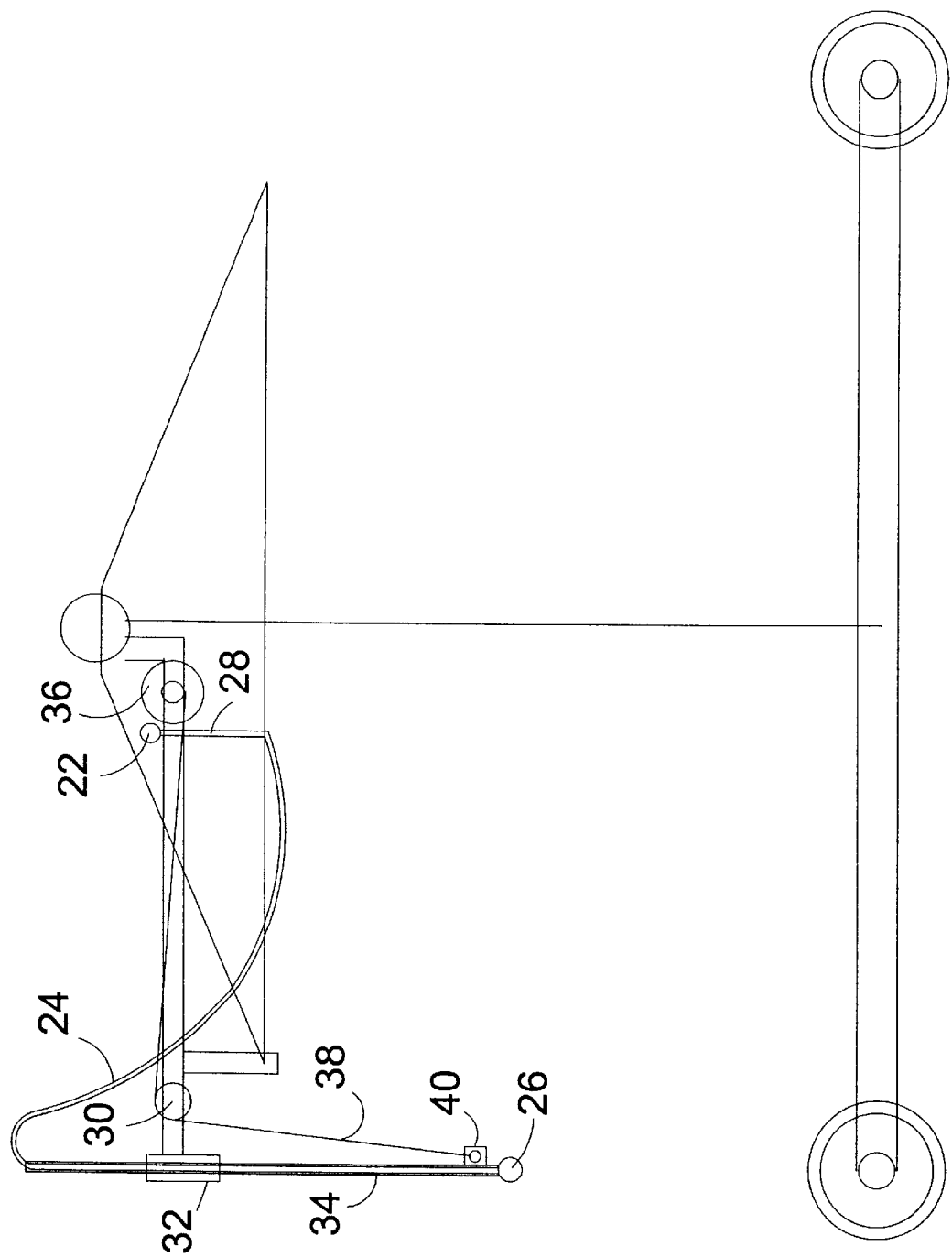
FIG. 4 is an illustrative view of the height adjustment.

Referring to FIG. 4, shown is a side view of a tower 12. The tower has a main distribution line 22 connected to spray boom 26 by spray boom supply hose 24. Spray boom supply hose 24 has supply solenoid 28 incorporated therein for turning the spray boom 26 on and off. The spray boom 26 is suspended from tower 12 by support rod 34 and spray boom support brace 32. Support rod 34 is held by spray boom adjustment cable 38 having one distal end connected to support rod cable attachment 40 and the other distal end connected to spray boom adjustment spool 36. The cable 38 is further suspended over spray boom adjustment pulley 30. Movement of a crank, not shown, selectively adjusts the amount of cable, thereby selectively raising and lower the spray boom 26.

Figure 5:
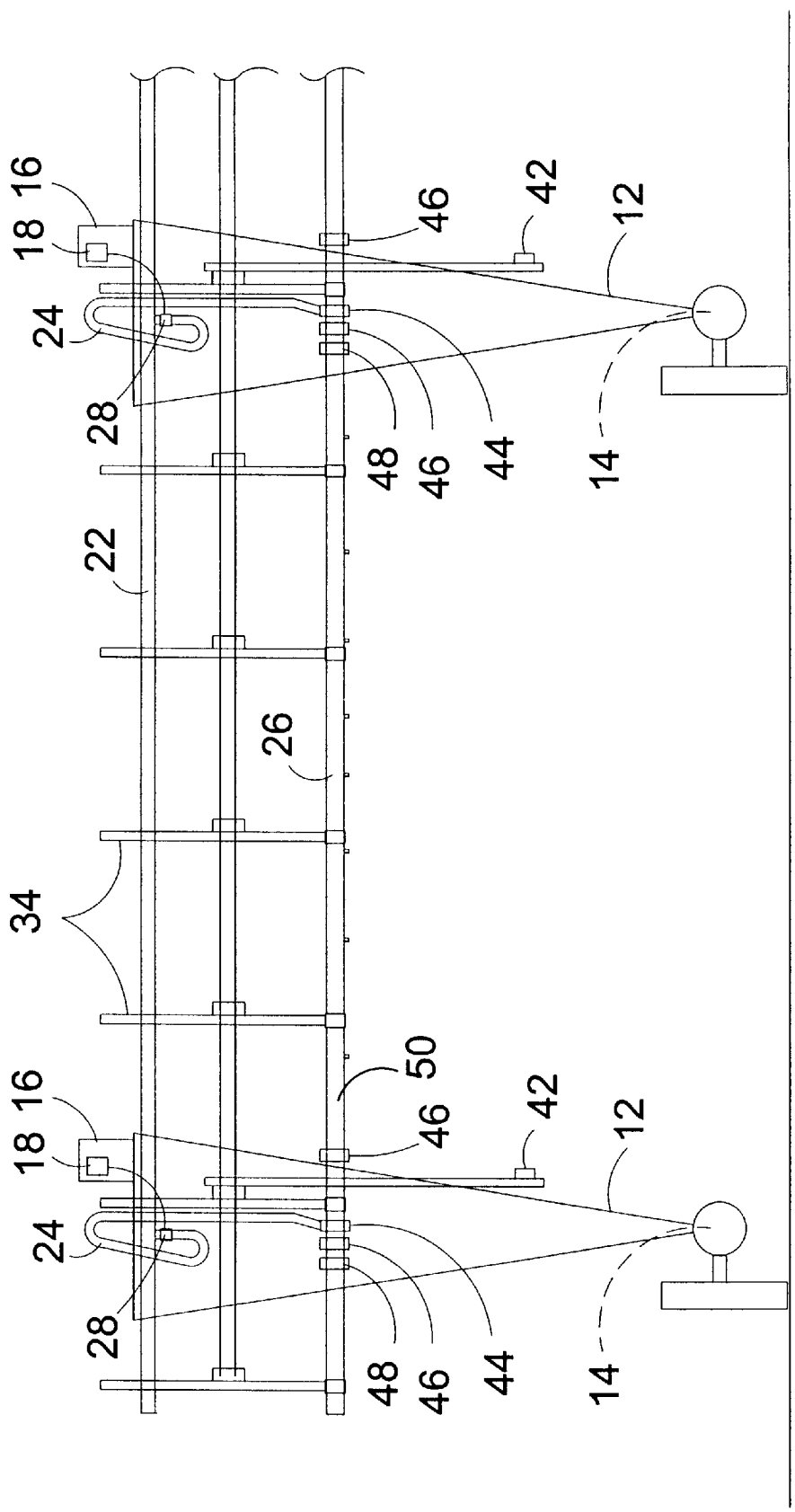
FIG. 5 is an illustrative view of the nozzle spacing.
Figure 6:
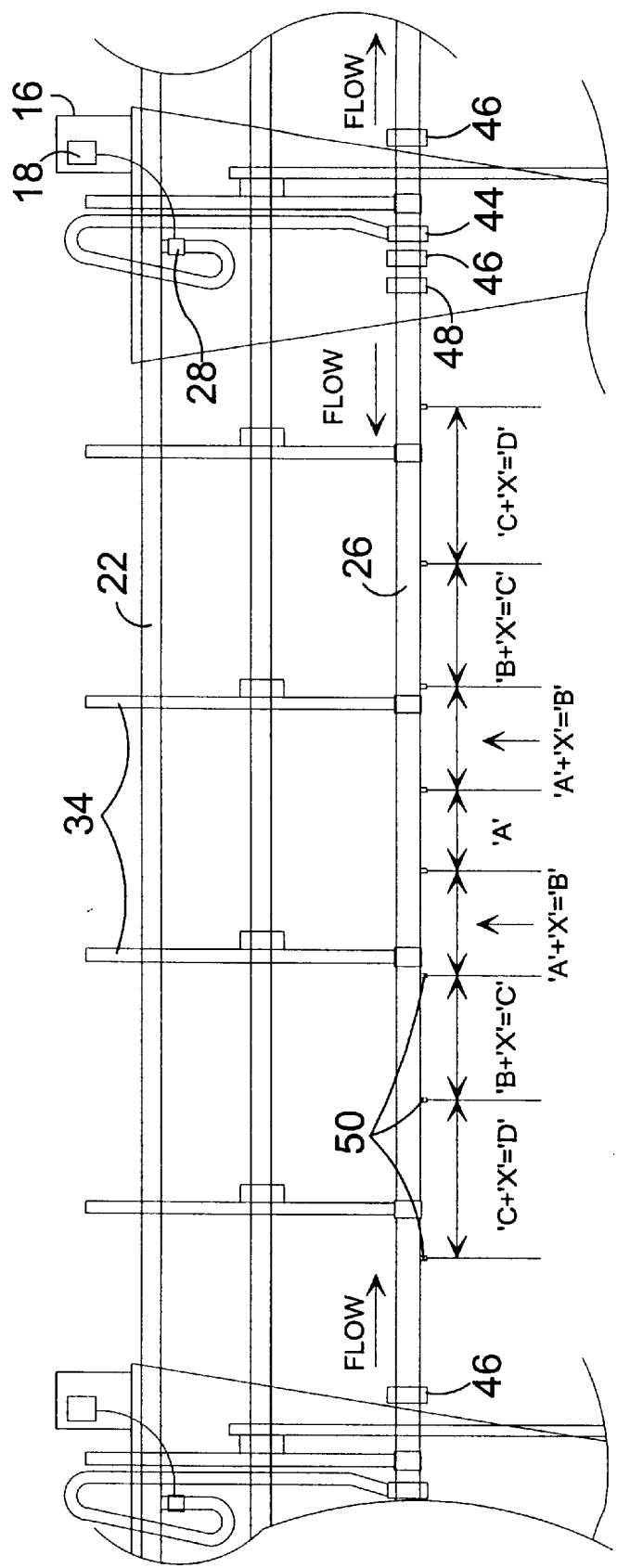
FIG. 6 is an illustrative view of flow regulators varying the pressure.
Figure 7:
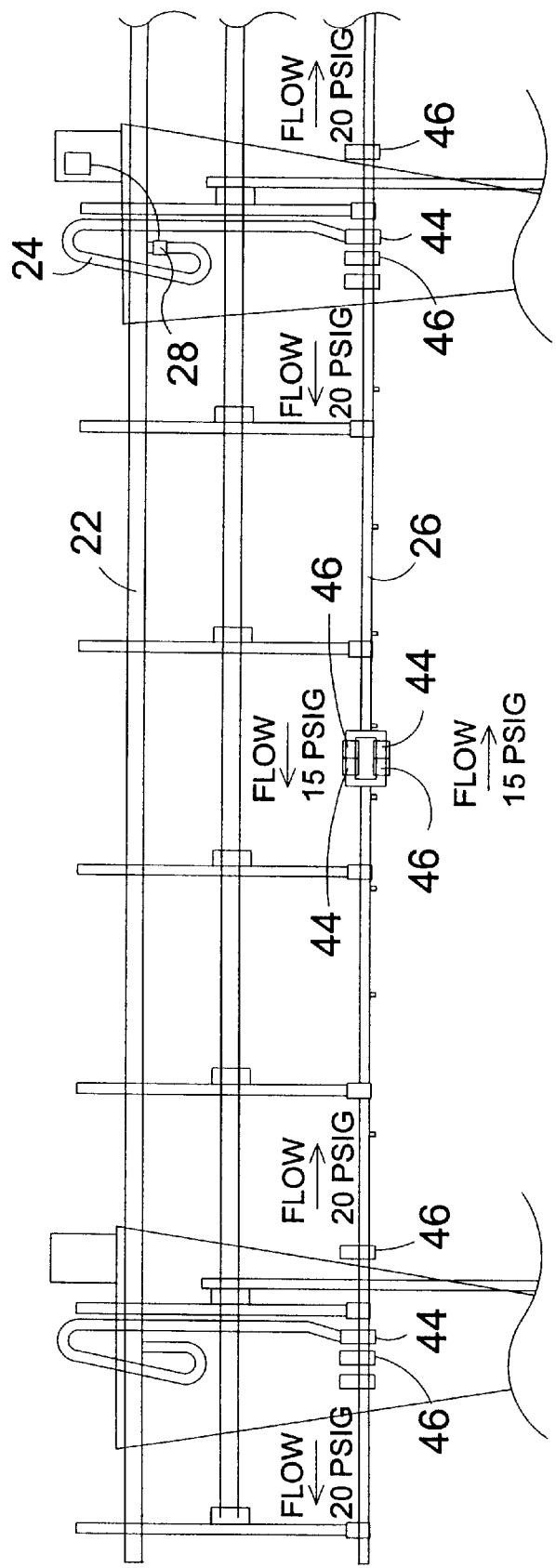
FIG. 7 is an illustrative view of flow regulators and check valves varying the pressure within the spray boom.

Referring to FIG. 5, shown is the circle irrigation system of the present invention having means for raising and lowering the height of the spray boom 26 relative to the ground. To better control the area where the chemical application is to occur the spray boom 26 can be moved to a height just above the target plants. There is a quick disconnect 48 fitting on each tower 12 whereby the applicable section of supply can be disconnected from the adjacent towers 12 so that a single individual can move from tower boom to tower boom adjusting each one. Also shown are spray boom supply hose 24 that has sufficient length to extend to the spray boom lowest point. The spray boom 26 is extended and contracted using support rod height adjuster 42.

Referring to FIG. 6, shown is an illustrative view of the nozzle 50 spacing. Shown is the circle irrigation system of the present invention having means for controlling the rate of application based on spacing the nozzle 50 at varying distances to compensate for the speed variation from one end of the boom to the other. Shown is a central distance 'a' between the nozzles 50. Adding a distance 'x' to each of the opposing nozzles 50 derives a calculated distance for the next set of opposing nozzles. This process continues until the next boom is encountered whereupon the process is repeated to the distal ends of the irrigation line.

Referring to FIG. 7, shown is an illustrative view of flow regulators 46 and check valves 44 varying the pressure within the spray boom 26. The main distribution line supplies the chemical solution to the spray boom 26 via supply line 24. Supply line 24 interfaces with the spray boom 26 with a predetermined rated flow regulator, for illustrative purposes 20 PSIG, and a check valve providing directional flow control. Each tower 12 has a flow regulator of 20 PSIG which provides application fluid in both horizontal directions to a mid boom pair of check valves and flow regulator rated at 15 PSIG. If a tower's 20 PSIG is turned off because the tower has stopped moving, then the adjacent tower's 20 PSIG flow regulator will supply a stepped down chemical solution of 15 PSIG from the boom mid point to the tower which compensates for the half boom movement occurring.

What is claimed is new and desired to be protected by Letters Patent is set forth in the appended claims:

1. A self propelled spraying and irrigation apparatus comprising a boom having a first distribution pipe movable along a predetermined path supported by spaced apart towers, each tower having a motive device, a switch for engaging said tower motive device and a time delay switch on top of each tower for delaying the startup of each motive device, a second distribution pipe parallel to said first distribution pipe with nozzles for spraying fluid therefrom suspended from each tower by a support rod passing through a sleeve and having a lower end of said support rod attached to said second distribution pipe, supply conduits for fluid transfer from said first distribution pipe to said second distribution pipe, and a height adjustment assembly at each tower, each height adjustment assembly comprising a cable attached to said support rod adjacent said second distribution pipe, said cable riding over a pulley and onto a adjustment spool the rotation of which raises and lowers said second distribution pipe each tower.

2. The system as recited in claim 1, wherein the second parallel distribution pipe is comprised of a series of conduits interconnected by quick connect fasteners and the first distribution pipe is connected to sources of water and chemicals for mixing into said water.

3. The system as recited in claim 2, wherein the supply conduit has a switch at each tower providing flow control means for pressurizing the second parallel distribution pipe.

4.The system as recited in claim 3, wherein each supply conduit has a flow control valve for pressurizing the second parallel distribution pipe to a predetermined pressure.

5. The system as recited in claim 4, wherein at least one flow control valve is preferably rated at 20 PSIg.

6. The system as recited in claim 4, wherein the connection of each supply conduit to said second distribution pipe has check values positioned on both sides of said connection working in opposite directions.

7. The system as recited in claim 6, wherein each section of second parallel distribution pipe between connections bounded by supply conduit flow regulators has incorporated therein a pair of centrally positioned flow regulators and check valves.

8. The system as recited in claim 7, wherein at least one flow regulator is preferably rated at 15 PSIg.

9. The system as recited in claim 8, wherein the spacing of nozzles is at varying distances to compensate for speed variations from one end of the boom to the other, said boom being designed to irrigate in circles.

10. The system as recited in claim 3, wherein the check valves positioned on each side of the supply conduit flow regulators provides for fluid transfer from said regulators while preventing fluid movement back to said flow regulators.

* * * * *